United States Patent Office 3,145,205
Patented Aug. 18, 1964

3,145,205
6-BENZOQUINOXALINE-CARBOXAMIDES
Thomas S. Osdene, West Chester, Pa., assignor to American Home Products Corporation, New York, N.Y., a corporation of Delaware
No Drawing. Filed Dec. 10, 1962, Ser. No. 243,612
13 Claims. (Cl. 260—247.2)

This invention relates to new benzoquinoxalines and to methods of preparing the same. More particularly this invention relates to 3-amino-N-(alkyl)benzo[f]quinoxaline-2-carboxamides of the general formula

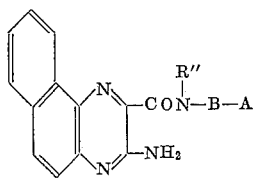

(I)

wherein A is selected from the group consisting of —OR, wherein R is lower alkyl; —N(R')$_2$, wherein R' is lower alkyl; piperazino, pyrrolidino, piperidino and morpholino; R'' is selected from the group consisting of hydrogen, and lower alkyl in straight or branched chain, B is a bivalent alkylene radical of 2 to 5 carbon atoms, which may include one or two hydroxy substituents.

In the structure Formula I the lower alkyl group represented by R and R' in the radicals —OR and —N(R')$_2$ and by R'' include methyl, ethyl, propyl, isopropyl, butyl, isobutyl, and the like. The radical —OR is derived from a selected cyano N-(alkoxyalkyl)acetamide used in preparing the new compound of this invention as is described more completely hereinafter. The radical —N(R')$_2$ is similarly obtained from a selected cyano N-(dialkylaminoalkyl)acetamide. The group identified as pyrrolidino, piperazino, piperidino and morpholino are derived from their representative precursors pyrrolidine, piperazine, piperidine and morpholine in the manner described below.

The compounds of Formula I possess properties which make them useful as antiviral agents, specific activity being found against herpes simplex, SK polio and NWS influenza. Certain of the new compounds of the present invention are useful in preventing convulsions. Other compounds of the present invention are effective as muscle relaxants. Still other compounds encompassed within the class defined by Formula I are useful as hypotensive agents while others are effective as antibacterial agents. When utilized for such purposes, the compounds may be, administered orally or parenterally in suitable form and amount. The form may be as injectables, elixirs, capsules, lozenges, tablets, etc., along with appropriate liquid or solid vehicles, excipients or carriers according to conventional pharmaceutical practice.

The new compounds of the present invention encompassed within the scope of the general Formula I are produced by condensing 1-nitroso-2-naphthylamine with a selected 2-cyanoacetamide such as 2-cyano-N-(dialkylaminoalkyl)acetamide, 2-cyano-N-(alkyloxyalkyl)acetamide or 2-cyano-n-(alkyl-dialkylaminoalkyl) acetamide. Additionally, acetamides such as 2-cyano-N-(morpholinoalkyl)acetamide, 2-cyano-N-(piperidinoalkyl)acetamide, 2-cyano - N - (methylpiperazino)acetamide and 2 - cyano-N-(pyrrolidinoalkyl) acetamide can be used equally as well. The foregoing acetamides are readily prepared by an amidation reaction between an alkyl cyanoacetate, e.g. ethyl cyanoacetate, and a disubstituted aminoalkylamine.

In order to effect the described condensation of the selected acetamide with the nitroso naphthylamine, the reactants are placed together in a suitable vessel together with a catalytic amount of an alkali metal-alcohol solution. While sodium in absolute ethanol is preferred, other alkali metals such as potassium in ethanol, methanol and the like may be used. The reactant mixture is then heated under reflux for a period of from 10 to 60 minutes at a reflux temperature that is governed by the boiling range of the reactant mixture. Normally the temperature will be in the range of from 50–200° C. and preferably from about 80 to 100° C. During the course of reflux, the reaction mixture may be stirred. After completion of the condensation reaction as evidenced by the formation of a precipitate or a change in color of the reaction mixture, the mixture is cooled and the precipitate removed by filtration. If no precipitate has formed, the colored solution can be filtered to remove unreacted materials and the filtrate evaporated to dryness. Recrystallization can then be carried out with a suitable solvent such as ethanol, methanol, petroleum ether and the like. The products on purification are yellow crystalline solids.

The examples which follow will provide a more complete understanding of the new compounds of the invention, their characteristics and properties as well as the method by which they may be prepared.

Example I

To a solution of 0.2 g. of sodium in 100 ml. of absolute ethanol is added 4.3 g. of 1-nitroso-2-naphthylamine followed by 5.0 g. of 2-cyano-N-(2-diethylamino-ethyl)acetamide. The mixture is boiled under reflux for 30 minutes, and on cooling in an ice bath a thick crystalline precipitate is deposited out of solution. This is removed by filtration and washed successively with ethanol, ether and petrol; yield=6.6 g., M.P. 136–138° C. Recrystallization from ethanol affords yellow needles of 3-amino-N-(2-diethylaminoethyl)benzo[f]quinoxaline - 2 - carboxamide, M.P. 136–138° C.

*Analysis.*—Calculated: C=67.63, H=6.87, N=20.76. Found: C=67.66, H=7.03, N=20.78.

In the examples which follow all temperatures reported are centigrade temperatures unless identified to the contrary.

Example II

To a solution of 0.1 g. of sodium in 250 ml. of absolute ethanol is added 6.88 g. of 1-nitroso-2-naphthylamine followed by 9.0 g. of 2-cyano-N-(3-morpholinopropyl) acetamide. The mixture is stirred and boiled under reflux for 1 hour. Following this 2.0 g. of sodium methylate is added and the mixture is boiled for a further 15 minutes during which time an orange color is noted. After filtering, the solution is concentrated to small bulk when an orange colored material is obtained; wt.=10 g., M.P. 159°. Recrystallization from methanol affords 3 - amino - N - (3 - morpholinopropyl)benzo[f]quinoxaline-2-caboxamide as yellow crystals; M.P. 160°.

*Analysis.*—Calculated: C=65.73, H=6.34, N=19.17. Found: C=65.43, H=6.20, N=19.08.

Example III

To a solution of 1.0 g. of sodium in 250 ml. of absolute ethanol is added 6.88 g. of 1-nitroso-2-naphthylamine and 8.58 g. of 2-cyano-N-(2-piperidinoethyl)acetamide. The mixture is stirred and boiled under reflux for 20 minutes. After 10 minutes a precipitate is deposited from the solution. After cooling this is removed by filtration; wt.=10.3 g., M.P. 185°. Recrystallization from ethanol affords 3 - amino - N - (2 - piperidinoethyl)benzo[f] quinoxaline-2-carboxamide, M.P. 185°.

*Analysis.*—Calculated: C=68.74, H=6.64, N=20.05. Found: C=68.91, H=6.80, N=19.76.

Example IV

Following the method of Examples I–III, 3-amino-N-

(3 - dimethylaminopropyl)benzo[f]quinoxaline - 2 - carboxamide is prepared by condensing 2-cyano-N-(3-dimethylaminopropyl)acetamide with 1-nitroso-2-naphthylamine.

Example V

According to the method of Example I, 3-amino-N-ethyl - N - (2 - dimethylaminoethyl)benzo[f]quinoxaline-2-carboxamide is prepared by condensing 2-cyano-N-ethyl-N - (2 - dimethylaminoethyl)acetamide with 1 - nitroso-2-naphthylamine.

Example VI

According to the method of Example I, 3-amino-N-(2 - dimethylaminopropyl)benzo[f]quinoxaline - 2 - carboxamide is prepared by condensing 2-cyano-N-(2-dimethylaminopropyl)acetamide with 1-nitroso-2-naphthylamine.

Example VII

To a solution of 1.0 g. of sodium metal in 250 ml. of absolute ethanol, there is added 6.88 g. of 1-nitroso-2-naphthylamine, followed by 6.87 g. of 2-cyano-N-(2-ethoxyethyl)acetamide. The mixture is stirred and boiled under reflux for 30 minutes during which time a yellow precipitate deposits out of solution. After cooling and filtration 8 g. of a material, M.P. 161° is obtained. Recrystallization from ethanol affords 3-amino-N-(2-ethoxyethyl)benzo[f]quinoxaline - 2 - carboxamide, M.P. 162°.

*Analysis.*—Calculated: C=65.79, H=5.85, N=18.05. Found: C=65.70, H=5.59, N=18.20.

Example VIII

Following the method set forth in Example VII reaction of 1-nitroso-2-naphthylamine with 2-cyano-N-(2-methoxyethyl)acetamide in the presence of sodium ethylate produces the product 3-amino-N-(2-methoxyethyl)benzo[f]quinoxaline-2-carboxamide.

Example IX

According to the method of Example VII, 3-amino-N-(3-methoxypropyl)benzo[f]quinoxaline-2-carboxamide is prepared by condensing 1-nitroso-2-naphthylamine with 2-cyano-N-(3-methoxypropyl)acetamide.

Example X

To a solution of 1.0 g. of sodium in 250 ml. of absolute ethanol is added 6.88 g. of 1-nitroso-2-naphthylamine, followed by 8.67 g. of 2-cyano-N-(2-morpholinoethyl)acetamide. The mixture is stirred and boiled under reflux for 15 minutes during which time a precipitate deposits out of solution. After cooling, the precipitate is removed by filtration; wt.=10.8 g., M.P. 223°. Recrystallization from ethanol provides 3-amino-N-(2-morpholinoethyl)benzo[f]quinoxaline-2-carboxamide; M.P. 221°.

*Analysis.*—Calculated: C=64.94, H=6.02, N=19.93. Found: C=65.04, H=5.86, N=20.27.

Example XI

To a solution of 1.0 g. of sodium in 100 ml. of absolute ethanol is added 6.88 g. of 1-nitroso-2-naphthylamine and 8.8 g. of 2-cyano-N-(3-diethylaminopropyl)acetamide. The mixture is stirred mechanically and boiled under reflux for 30 minutes. The deep red solution is filtered and evaporated to dryness on a rotary evaporator at which time a brownish red residue is obtained; wt.=14.5 g. This is placed in a Soxhlet extractor and continuously extracted with petroleum ether for 2 days. There is obtained 7.0 g. of yellow silky needles from the petroleum extract. Recrystallization from cyclohexane provides 3-amino-N-(3-diethylaminopropyl)benzo[f]quinoxaline-2-carboxamide; M.P. 108°.

*Analysis.*—Calculated: C=68.35, H=7.17, N=19.93. Found: C=68.51, H=6.98, N=19.77.

Example XII

To solution 2.2 g. of sodium methylate in 100 ml. of absolute ethanol is added 6.88 g. of 1-nitroso-2-naphthylamine followed by 7.5 g. of 2-cyano-N-(3-isopropoxy)-propylacetamide. The mixture is boiled under reflux for 17 minutes during which time a yellow precipitate deposits. After cooling in ice, the material is removed by filtration and dried, yield=8.8 g., M.P. 98°. Recrystallization from ethanol affords 3-amino-N-(3-isopropoxypropyl)benzo[f]quinoxaline-2-carboxamide, M.P. 103°.

*Analysis.*—Calculated: C=67.43, H=6.58, N=16.56, Found: C=67.26, H=6.26, N=16.62.

Example XIII

To a solution of 1.0 g. of sodium in 250 ml. of absolute ethanol is added 6.88 g. of 1-nitroso-2-naphthylamine followed by 9.28 g. of 2-cyano-N-(2-di-isopropylaminoethyl)acetamide. The mixture is stirred and boiled under reflux for 40 minutes and cooled; an orange colored precipitate is obtained. After filtration and recrystallization from ethanol there is obtained 9.8 g. of 3-amino-N-(2-diisopropylaminoethyl)benzo[f]quinoxaline - 2 - carboxamide, M.P. 153°.

*Analysis.*—Calculated: C=69.01, H=7.45, N=19.16. Found: C=69.20, H=7.49, N=19.17.

Example XIV

According to the method of the foregoing examples, 3 - amino - N - (3-di-n-butylaminopropyl)benzo[f]quinoxaline-2-carboxamide is prepared by condensing 2-cyano-N-(3 - di-n-butylaminopropyl)acetamide with 1 - nitroso-2-naphthylamine.

Example XV

According to the method of the foregoing examples, 3 - amino-N-(2 - pyrrolidinoethyl)benzo[f]quinoxaline-2 - carboxamide is prepared by reacting 2-cyano-N-(2-pyrrolidinoethyl)acetamide with 1-nitroso-2-naphthylamine.

Example XVI

Following the method described herein, 3-amino-N-(4-dimethylaminobutyl)benzo[f]quinoxaline - 2-carboxamide is prepared by condensing 1-nitroso-2-naphthylamine with 2-cyano-N-(4-dimethylaminobutyl)acetamide.

Example XVII

To a solution of 1.0 g. of sodium in 250 ml. of absolute ethanol is added 6.88 g. of 1-nitroso-2-naphthylamine followed by 6.82 g. of 2-cyano-N-(2-dimethylaminoethyl)acetamide. The mixture is stirred and boiled under reflux for 40 minutes. On cooling there is obtained a yellow precipitate which is removed by filtration and dried, wt.=6.0 g., M.P. 190°. Recrystallization from ethanol results in 3-amino-N-(2-dimethylaminoethyl)benzo[f]-quinoxaline-2-carboxamide, M.P. 191°.

*Analysis.*—Calculated: C=66.00, H=6.19, N=22.64. Found: C=65.61, H=6.09, N=22.52.

Example XVIII

To a solution of 1.0 g. of sodium in 500 ml. of absolute ethanol is added 6.88 g. of 1-nitroso-2-naphthylamine and 5.08 g. of 2-cyano-N-(2-aminoethyl)acetamide. The mixture is stirred and boiled under reflux for 2 hours. The mixture is filtered and evaporated to dryness on a rotary evaporator. The dark residue is placed in a Soxhlet extractor and extracted continuously with benzene from which a yellow material deposits. Several recrystallizations from ethanol will afford 3-amino-N-(2-aminoethyl) benzo[f]quinoxaline-2-carboxamide, M.P. 157°.

*Analysis.*—Calculated: C=64.04, H=5.37, N=24.90. Found: C=63.68, H=5.39, N=24.61.

Example XIX

To a solution of 0.92 g. of sodium in 200 ml. of absolute ethanol is added 6.9 g. of 1-nitroso-2-naphthylamine and 8.73 g. of 2-cyano-N[(2-hydroxy-3-diethylamino)propyl]-acetamide. The mixture is boiled under reflux for 30 minutes and on cooling and scratching, there is obtained a yellow material, wt.=10.8 g., M.P. 135-139°. Recrystallization from benzene provides 3-amino-N-[(2-hydroxy - 3 - diethylamino)propyl]benzo[f]quinoxaline-2-carboxamide, M.P. 141-142°.

*Analysis.*—Calculated: C=65.37, H=6.86, N=19.06. Found: C=65.48, H=6.89, N=19.07.

Example XX

To a solution of 0.2 g. of sodium in 200 ml. of absolute ethanol is added 6.88 g. of 1-nitroso-2-naphthylamine and 11.15 g. of 2 - cyano-N-(isopropyl-2-diisopropylaminoethyl)acetamide. The mixture is stirred and boiled under reflux for 1 hour. A small amount of yellow percipitate (M.P. 360°) is deposited and this is removed by filtration. The filtrate is evaporated to leave a darkish partially solidified oil. Treatment with acetone followed by evaporation of the solvent yields a solid product which is continuously extracted with petrol in a Soxhlet extractor. Concentration of the extract provides a yellow product, M.P. 118°. Crystallization from petrol, followed by crystallization from aqueous ethanol gives 3-amino-N-(isopropyl - 2 - diisopropylaminoethyl)benzo[f]quinoxaline-2-carboxamide, M.P. 134°.

*Analysis.*—Calculated: C=70.73, H=8.16, N=17.19. Found: C=70.74, H=8.18, N=16.97.

Example XXI

According to the method set forth in the foregoing examples 3-amino-N-[2-(4-methyl piperazino)ethyl]benzo[f]quinoxaline-2-carboxamide is prepared by condensing 2-cyano-N-[2-(4-methyl piperazino)ethyl]acetamide with 1-nitroso-2-naphthylamine.

Example XXII

To a solution of 0.2 g. of sodium in 100 ml. of ethanol is added 5.16 g. of 1-nitroso-2-naphthylamine and 5.5 g. of 2 - cyano-N-methyl-N-(2 - dimethylaminoethyl)acetamide. The mixture is stirred and boiled under reflux for 15 minutes, during which time a precipitate deposits. This is removed by filtration and discarded. The filtrate is concentrated to small bulk on a rotary evaporator and on cooling a yellow material is obtained. Recrystallization from cyclohexane affords 3-amino-N-methyl-N-(2-dimethylaminoethyl)benzo[f]quinoxaline - 2 - carboxamide, M.P. 126°.

The foregoing examples are to be considered representative of the new compounds of the present invention and are not to be considered in any way limiting the same. It is intended that the invention be limited only by the claims appended hereto.

What is claimed is:

1. A compound of the formula

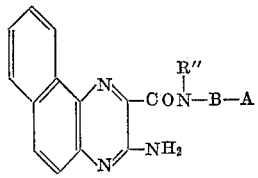

wherein A is selected from the group consisting of —OR wherein R is lower alkyl, —N(R')$_2$ wherein R' is lower alkyl; piperazino, pyrrolidino, piperidino and morpholino; R'' is selected from the group consisting of hydrogen and lower alkyl; and B is selected from the group consisting of —CH$_2$CHOHCH$_2$— and —(CH$_2$)$_n$—wherein $n$ has a value of from 2 to 5 inclusive.

2. A compound of the formula

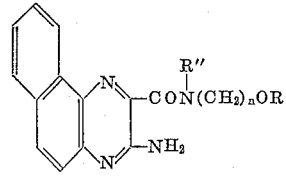

wherein R and R'' are lower alkyl and $n$ is an integer from 2 to 5 inclusive.

3. A compound of the formula

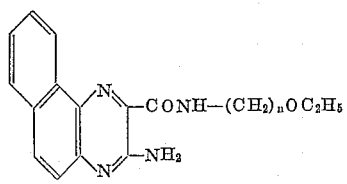

and $n$ is an integer from 2 to 5 inclusive.

4. 3 - amino-N-(2 - ethoxyethyl)benzo[f]quinoxaline-2-carboxamide.

5. 3 - amino-N-(3-isopropoxypropyl)benzo[f]quinoxaline-2-carboxamide.

6. A compound of the formula

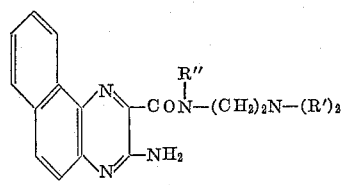

wherein R' and R'' are lower alkyl.

7. 3 - amino-N-(2 - diethylaminoethyl)benzo[f]quinoxaline.

8. 3 - amino - N - (2 - diisopropylaminoethyl(benzo[f]quinoxaline-2-carboxamide.

9. 3 - amino - N - ethyl - N - (2 - dimethylaminoethyl)benzo[f]quinoxaline-2- carboxamide.

10. 3 - amino-N-[(2-hydroxy-3-diethylamino)propyl]benzo[f]quinoxaline-2-carboxamide.

11. 3 - amino-N-(2-morpholinoethyl)benzo[f]quinoxaline-2-carboxamide.

12. 3 - amino - N - (2 - piperidinoethyl)benzo[f]quinoxaline-2-carboxamide.

13. 3 - amino - N - methyl-N-(2-dimethylaminoethyl)benzo[f]quinoxaline-2-carboxamide.

No references cited.